United States Patent
Chang et al.

(10) Patent No.: US 9,760,488 B2
(45) Date of Patent: Sep. 12, 2017

(54) CACHE CONTROLLING METHOD FOR MEMORY SYSTEM AND CACHE SYSTEM THEREOF

(71) Applicant: MACRONIX INTERNATIONAL CO., LTD., Hsinchu (TW)

(72) Inventors: Hung-Sheng Chang, Taipei (TW); Hsiang-Pang Li, Zhubei (TW); Yuan-Hao Chang, Taipai (TW); Tei-Wei Kuo, New Taipei (TW)

(73) Assignee: MACRONIX INTERNATIONAL CO., LTD., Hsinchu (TW)

(*) Notice: Subject to any disclaimer, the term of this patent is extended or adjusted under 35 U.S.C. 154(b) by 105 days.

(21) Appl. No.: 14/825,204

(22) Filed: Aug. 13, 2015

(65) Prior Publication Data
US 2016/0154736 A1 Jun. 2, 2016

Related U.S. Application Data (60) Provisional application No. 62/085,661, filed on Dec. 1, 2014.

(51) Int. Cl.
*G06F 12/08* (2016.01)
*G06F 12/0815* (2016.01)
*G06F 12/0811* (2016.01)
*G06F 12/1009* (2016.01)

(52) U.S. Cl.
CPC ...... *G06F 12/0815* (2013.01); *G06F 12/0811* (2013.01); *G06F 12/1009* (2013.01); *G06F 2212/1021* (2013.01); *G06F 2212/283* (2013.01); *G06F 2212/608* (2013.01)

(58) Field of Classification Search
CPC ............. G06F 12/0811; G06F 12/0815; G06F 2212/1021; G06F 12/123; G06F 2212/283; G06F 2212/7209; G06F 12/12; G06F 2212/69; G06F 12/1009; G06F 2212/608

See application file for complete search history.

(56) References Cited

U.S. PATENT DOCUMENTS

| | | | |
|---|---|---|---|
| 2003/0105929 A1* | 6/2003 | Ebner | G06F 12/084 711/144 |
| 2005/0289302 A1* | 12/2005 | Barry | G06F 12/0831 711/144 |
| 2010/0235586 A1* | 9/2010 | Gonion | G06F 12/0831 711/144 |
| 2014/0025923 A1* | 1/2014 | Klein | G06F 12/123 711/207 |

OTHER PUBLICATIONS

Chang, et al.: "A Light-Weighted Software-Controlled Cache for PCM-based Main Memory Systems"; ACM/IEEE International Conference on Computer-Aided Design (ICCAD), Nov. 2015. ; pp. 1-8.

* cited by examiner

*Primary Examiner* — Hashem Farrokh
(74) *Attorney, Agent, or Firm* — McClure, Qualey & Rodack, LLP

(57) ABSTRACT

A cache system is provided. The cache system includes a first cache and a second cache. The first cache is configured for storing a first status of a plurality of data. The second cache is configured for storing a table. The table includes the plurality of data arranged from a highest level to a lowest level. The cache system is configured to update the first status of the plurality of data in the first cache. The cache system is further configured to update the table in the second cache according to the first status of the plurality of data.

17 Claims, 5 Drawing Sheets

CACHE CONTROLLING METHOD FOR MEMORY SYSTEM AND CACHE SYSTEM THEREOF

This application claims the benefit of U.S. application Ser. No. 62/085,661, filed Dec. 1, 2014, the disclosure of which is incorporated by reference herein in its entirety.

BACKGROUND

Technical Field

The disclosure relates in general to a cache controlling method for a memory system and a cache system.

Description of the Related Art

In recent years, there are strong demands to use flash memory or MRAM, or PCM to replace DRAM as the main memory to reduce the power consumption and improve the performance. However, PCM suffers from limited endurance and have higher access latency than DRAM. A proposed method to solve the problem is providing some buffer, such as DRAM or MRAM, to absorb the intensive read and write accesses for a PCM system. As a result, a control system to manage both the DRAM and the PCM system is needed. Therefore, it is one of desirable goals to provide a cache controlling method for a memory system and a cache system without complex hardware control circuit.

SUMMARY

The disclosure is directed to a cache controlling method for a memory system and a cache system.

According to the disclosure, a cache system is provided. The cache system includes a first cache and a second cache. The first cache is configured for storing a first status of a plurality of data. The second cache is configured for storing a table. The table includes the plurality of data arranged from a highest level to a lowest level. The cache system is configured to update the first status of the plurality of data in the first cache. The cache system is further configured to update the table in the second cache according to the first status of the plurality of data.

According to the disclosure, a cache controlling method for a memory system is provided. The cache system includes a first cache and a second cache. The cache controlling method includes the following steps. Update a first status of a plurality of data in the first cache. And update a table in the second cache according to the first status of the plurality of data. The table includes the plurality of data arranged from a highest level to a lowest level.

DETAILED DESCRIPTION

In the present disclosure, a cache controlling method for a memory system and a cache system are provided. Several embodiments are provided hereinafter with reference to the accompanying drawings for describing the related configurations and procedures. However, the present disclosure is not limited thereto. The identical and/or similar elements of the embodiments are designated with the same or similar reference numerals.

Figure 1:
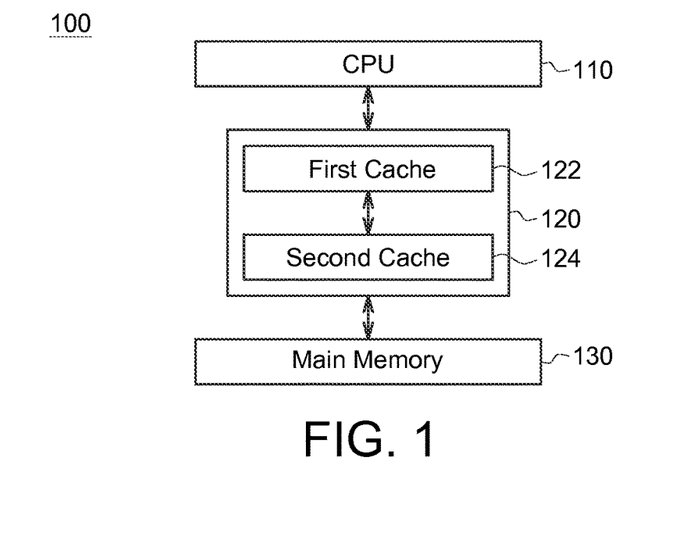
FIG. 1 shows a block diagram of a cache system of a computer according to the first embodiment of the present disclosure.

FIG. 1 shows a block diagram of a cache system of a computer 100 according to the first embodiment of the present disclosure. The computer 100 includes a CPU 110, a cache system 120 and a main memory 130. The cache system 120 may close the performance gap between the CPU 110 and the main memory 130. In this embodiment, the main memory 130 is a PCM. In some embodiments, the main memory 130 may be byte-addressability memory, such as bit-alterable NAND flash, NOR flash, Magnetic RAM, Resistive RAM and so on. The cache system 120 includes a first cache 122 and a second cache 124. In this embodiment, the first cache 122 is a memory management unit, such as translation lookaside buffer (TLB), and the second cache 124 is a DRAM. In some embodiments, the first cache 122 may be SRAM, L1 cache, or L2 cache.

The first cache 122 is configured for storing a first status of multiple data. The second cache 124 is configured for storing a table. The table includes multiple data arranged from a highest level to a lowest level. The cache system 120 is configured to update the first status of multiple in the first cache 122. The cache system 120 is further configured to update the table in the second cache 124 according to the first status of multiple data.

Since the first cache 122 has faster access speed than the second cache 124, we use hardware circuit to track and store the status of current accessing data and then update the corresponding status in the first cache 122 so that the runtime cost may be reduced. On the other hand, since the second cache 124 has a larger capacity and slower access speed than the first cache 122, we use software algorithm for managing the complicated data structure to track and store the status of all data, and then arrange all data from a highest level to a lowest level in a table so as to provide data-access-pattern information.

In the present disclosure, the data in the higher level represents that the data is being accessed more frequently and therefore it is more suitable for being stored in the second cache, and the data in the lower level represents that the data is being accessed less frequently and therefore it is more suitable for being removed from the second cache if the second cache is full.

Figure 2:
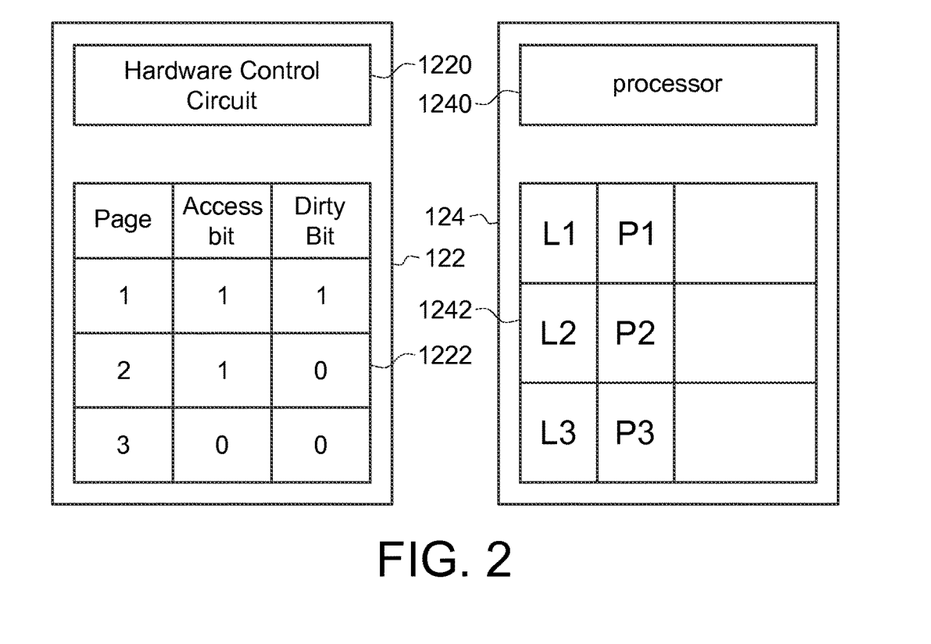
FIG. 2 shows a block diagram of a cache system according to the first embodiment of the present disclosure.

Referring to FIG. 2, FIG. 2 shows a block diagram of a cache system 120 according to the first embodiment of the present disclosure. The cache system 120 includes a first cache 122 and a second cache 124. The first cache 122 includes a hardware control circuit 1220. The first cache 122 is configured for storing a first status of multiple page data, as shown in block 1222. For instance, the first status denoted as cold "0", or hot "1" is recording in an access bit of the first cache 122 for each page data, and the access bit denoted as hot "1" indicates that the page data is being accessed recently, and the access bit denoted as cold "0" indicates that the page data is not being accessed recently.

The second cache 124 includes a processor 1240 and a table 1242. The table 1242 arranges the corresponding page data from a highest level to a lowest level according to the first status of the page data. For instance, the table of the second cache 124 is arranged from level L1 to level L3 according to the access bit. In this example, since the first status of the page data P3 is 0, which means it is not being accessed before, it is arranged in the lowest level, i.e. level L3, and the first status of the page data P1 and the first status of page data P2 are both 1, they are arranged in higher levels, i.e. level L1 and level L2. The level of each page data in the table 1242 may be adjusted in response to a certain events. For example, when a TLB miss event occurs in accessing a page data P, a victim page data V in the first cache 122 will be replaced by the accessing page data P. In the meantime, the level of accessing page data P and the level of victim page data V are adjusted according to the first status of the victim page data V and the accessing page data P stored in the first cache 122. Take another example, when a request page is not in the second cache 124, a victim page data V in the second cache will be replaced with the accessed page P. In the meantime, the level of accessing page data P and the level of victim page data V are adjusted according to the first status of the victim page data V and the accessing page data P stored in the first cache 122.

In some embodiments, the first cache 122 may store a second status of multiple page data. For instance, the second status denoted as clean "0", or dirty "1" is recording in a dirty bit of the first cache 122 for each page data, and the dirty bit denoted as dirty "1" indicates that the page data is being written before, and the access bit denoted as clean "0" indicates that the page data is not being written before. And the cache system 120 is further configured to update a second status of the plurality of data in the first cache 122 and update the table 1242 in the second cache 124 according to the second status of the page data. The table 1242 therefore includes a clean list and a dirty list, the clean list and the dirty list are arranged from the highest level to the lowest level.

Figure 3:
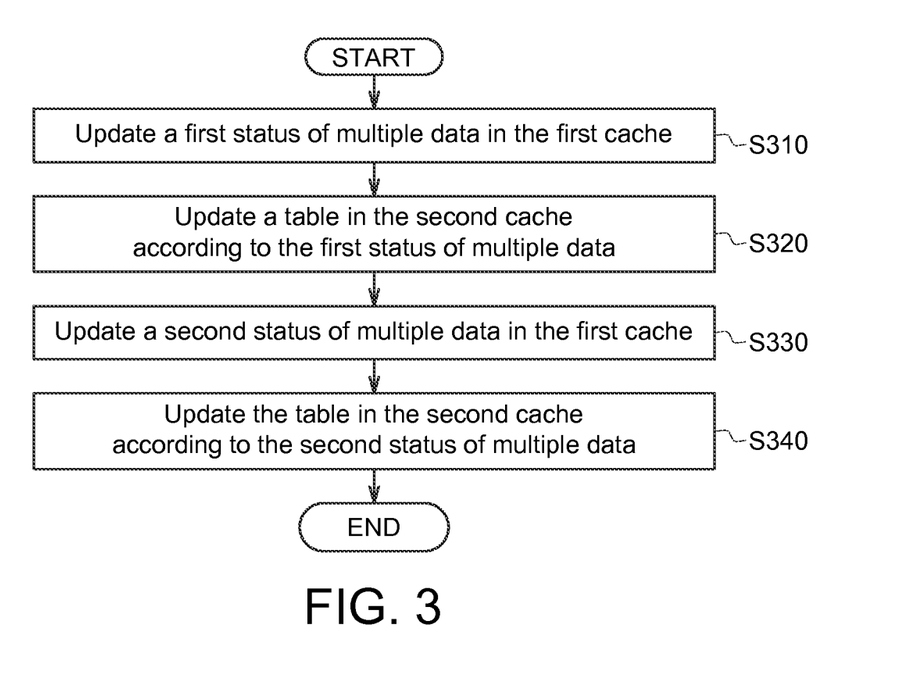
FIG. 3 shows a flow chart of a cache controlling method for a memory system according to the first embodiment of the present disclosure.

FIG. 3 shows a flow chart of a cache controlling method for a memory system according to the first embodiment of the present disclosure. Firstly, in step S310, update a first status of multiple data in the first cache. And in step S320, update a table in the second cache according to the first status of multiple data. The table includes multiple data arranged from a highest level to a lowest level. In some embodiments, the method may include step S330 to update a second status of multiple data in the first cache and step S340 to update the table in the second cache according to the second status of multiple data. It is noted that the performing sequences of the steps S330 and S340 as shown in FIG. 3 are not limited, and may be performed repeatedly by design.

Figure 4:
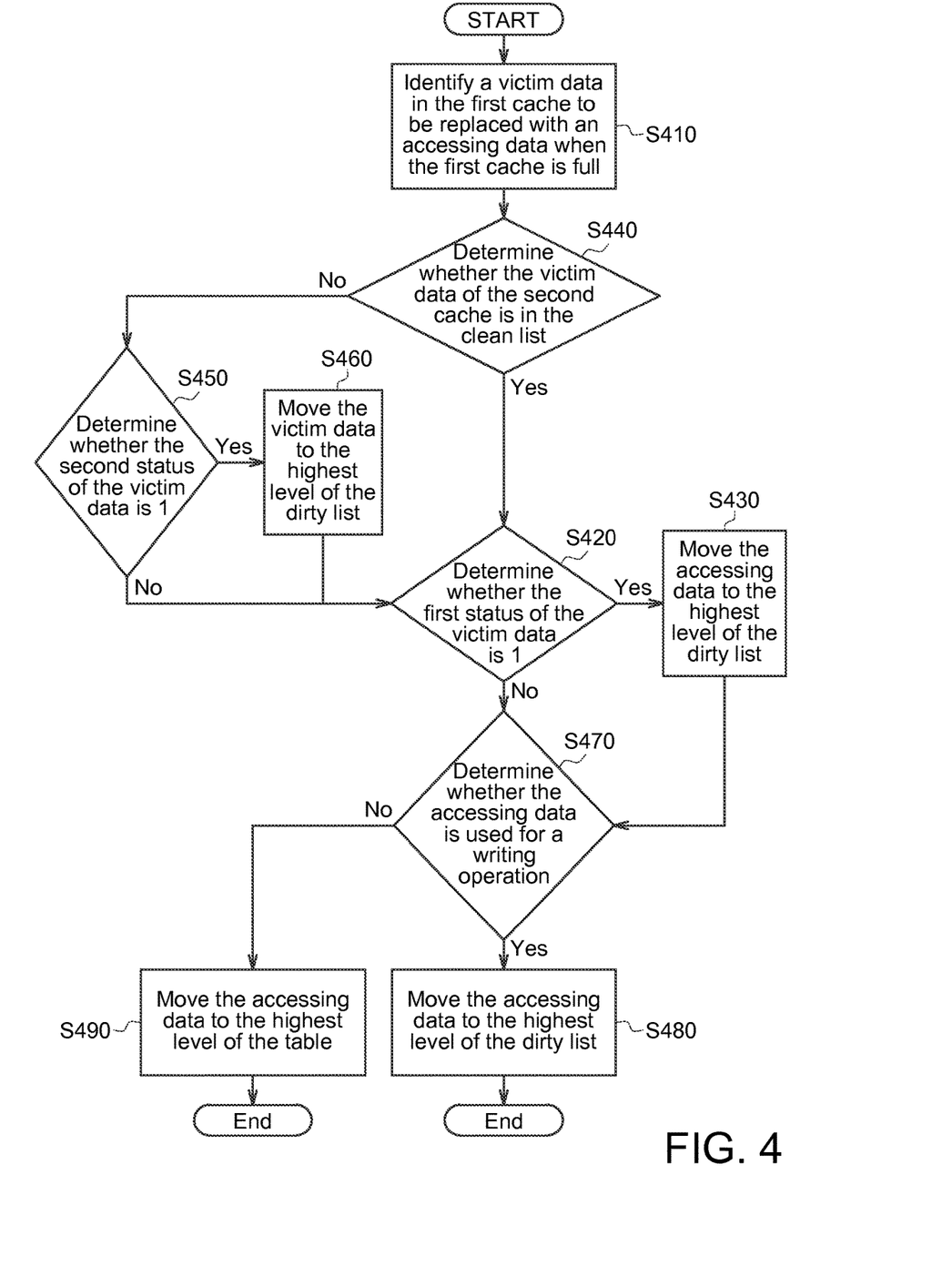
FIG. 4 shows a flow chart of a cache controlling method for a memory system according to a second embodiment of the present disclosure.

FIG. 4 shows a flow chart of a cache controlling method for a memory system according to a second embodiment of the present disclosure. In the second embodiment, the cache controlling method starts after a TLB miss event. Firstly, in step S410, identify a victim data in the first cache to be replaced with an accessing data. In step S420, determine whether the first status of the victim data is 1. In step S430, move the victim data to the highest level of the table when the first status of the victim data represents that the victim data is being accessed. In step S430, move the victim data to the highest level of the clean list when the second status of the victim data represents that the victim data is not being written, and move the victim data to the highest level of the dirty list when the second status of the victim data represents that the victim data is being written.

In some embodiments, the method may include step S440 to determine whether the victim data of the second cache is in the clean list. If the answer is yes, performing step S420 to determine whether the first status of the victim data is 1. If the victim data of the second cache is not in the clean list, performing step S450 to determine whether the second status of the victim data is 1. If the answer is yes, performing step S460 to move the victim data to the highest level of the dirty list. If the answer is no, performing step S420 to determine whether the first status of the victim data is 1.

In some embodiments, the method may include step S470 to determine whether the accessing data is used for a writing operation. And in step S480, move the accessing data to the highest level of the dirty list when the accessing data is used for a writing operation. If the accessing data is not used for a writing operation, then performing step S490 to move the accessing data to the highest level of the table. And in step S490, move the accessing data to the highest level of the dirty list when the second status of the victim data represents that the victim data is being written, and move the accessing data to the highest level of the clean list when the second status of the victim data represents that the victim data is not being written. And then the cache controlling method is completed. It is noted that the performing sequences of the steps S420, S440, S450 and S470 as shown in FIG. 4 are not limited, and may be performed repeatedly by design.

Figure 5:
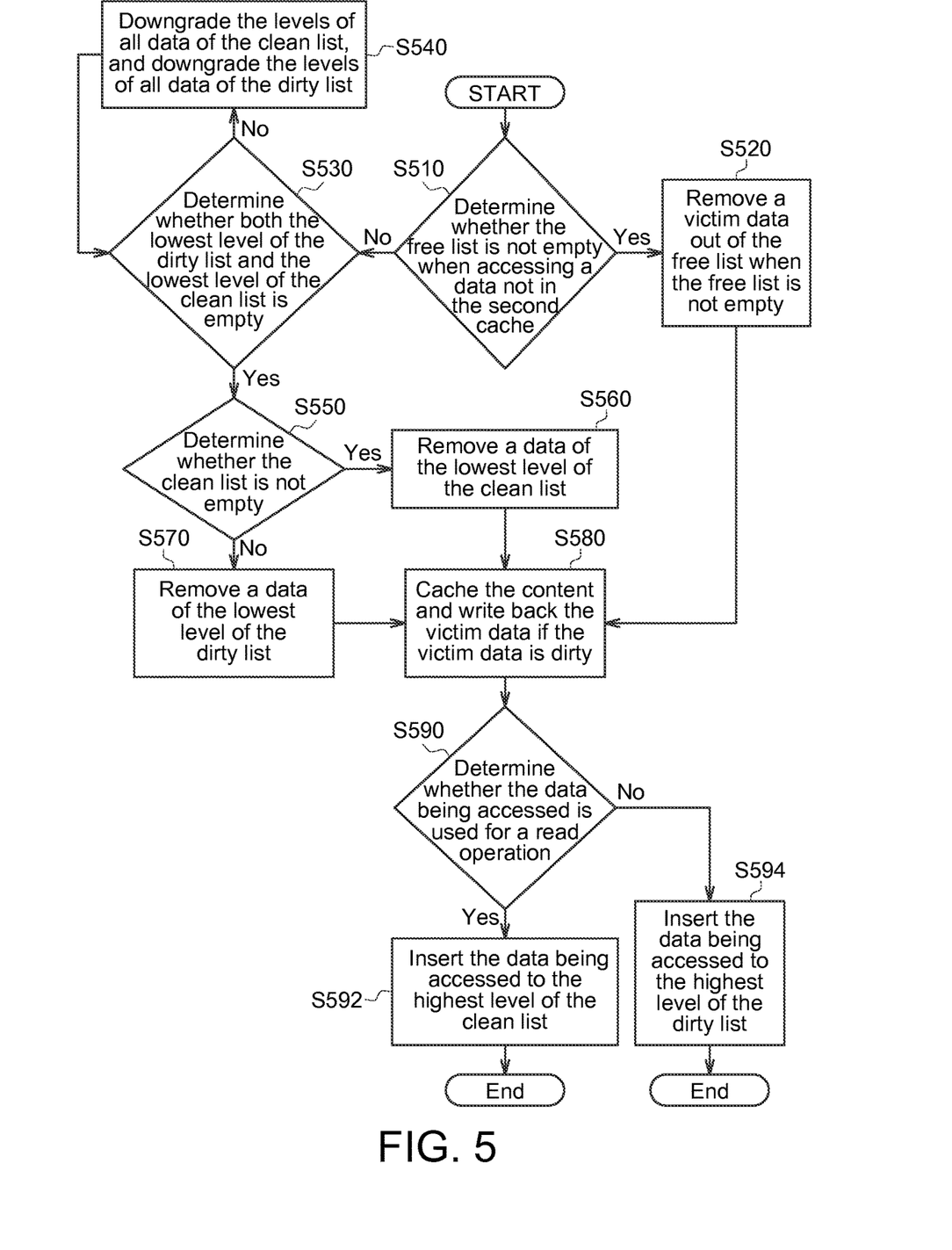
FIG. 5 shows a flow chart of a cache controlling method for a memory system according to a third embodiment of the present disclosure.

FIG. 5 shows a flow chart of a cache controlling method for a memory system according to a third embodiment of the present disclosure. In the third embodiment, the cache controlling method starts when a requested page is not in the second cache and needs a page replacement. Firstly, in step S510, determine whether the free list is not empty when accessing a data not in the second cache. In step S520, remove a victim data out of the free list when the free list is not empty. If the free list is empty, performing step S530 to determine whether both the lowest level of the dirty list and the lowest level of the clean list is empty. If both the lowest level of the dirty list and the lowest level of the clean is empty, performing step S540 to downgrade the levels of all data of the clean list, and downgrade the levels of all data of the dirty list. If the answer is no, performing step S550 to determine whether the clean list is not empty. If the clean list is not empty, then performing step S560 to remove a data of the lowest level of the clean list. If the clean list is empty, then performing step S570 to remove a data of the lowest level of the dirty list. And after step S520, S560 and S570, performing step S580 to cache the content and write back the victim data if the victim data is dirty.

In some embodiments, the cache controlling method may include step S590 to determine whether the data being accessed is used for a read operation. If the answer is yes, then performing step S592 to insert the data being accessed to the highest level of the clean list. And when the data being accessed is not used for a read operation, e.g. the data being accessed is used for a write operation, performing step S594 to insert the data being accessed to the highest level of the dirty list. And the cache controlling method is completed. It is noted that the performing sequences of the steps S510, S530, S550, and S590 as shown in FIG. 5 are not limited, and may be performed repeatedly by design.

Figure 6:
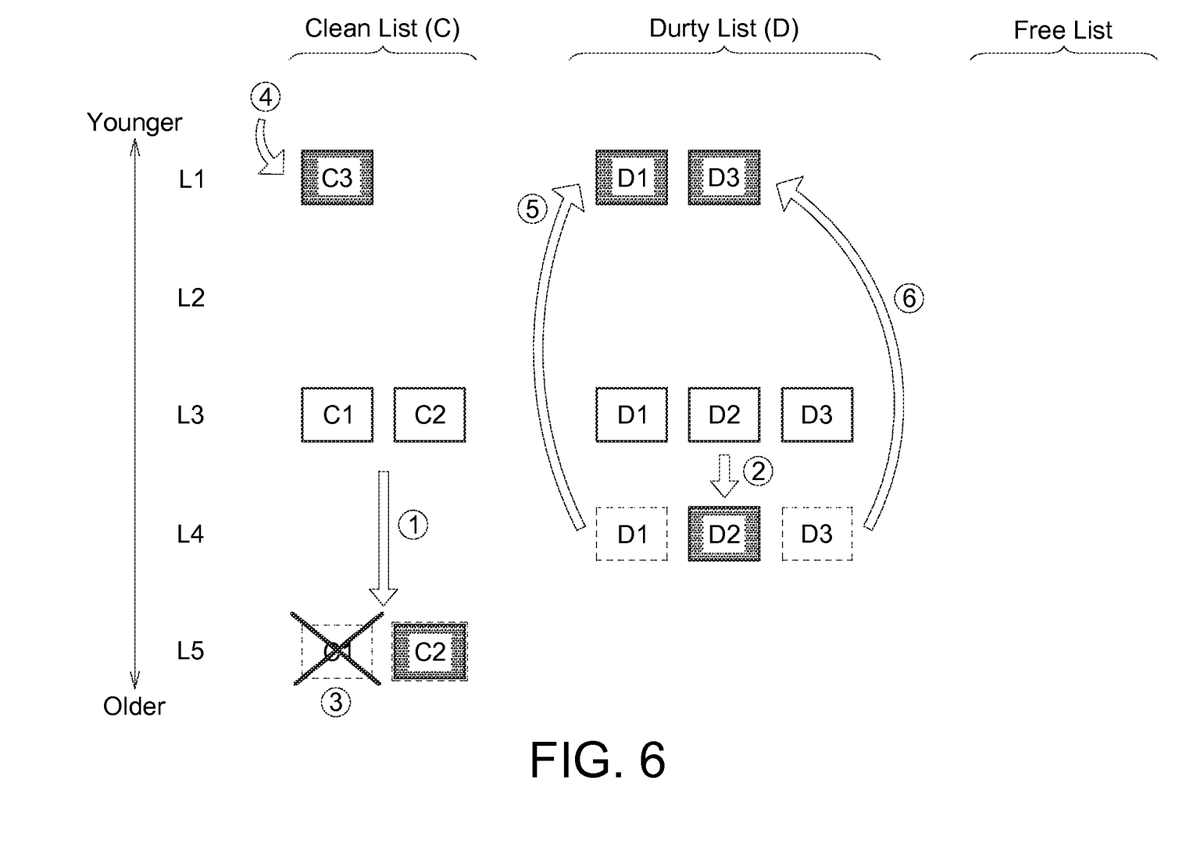
FIG. 6 shows a diagram of an example of the cache controlling method as shown in FIG. 4 and FIG. 5.

FIG. 6 shows a diagram of an example of the cache controlling method as shown in FIG. 4 and FIG. 5. As shown in FIG. 6, we arrange the data in the second cache 124 from the highest level L1 to the lowest level L5. Initially, data C1, C2 in the clean list are at level L3, and data D1, D2, D3 in the dirty list are also at level L3. Level L1 is the youngest level indicating that the data at level L1 is most recently being accessed, and level L5 is the oldest level indicating that the data is not recently being accessed or not being accessed before. Suppose that a read operation is issued to a non-cache-resident data C3, there is a DRAM cache miss such that the controlling method as shown in FIG. 5 is invoked to find a victim data for replacement. Since the free list is empty, and the eldest list (L5) of the dirty list and clean list are both empty, the step of S540 is performed. In this embodiment, we downgrade the data in clean list by 2 levels to level L5 (as shown in arrow 1), and downgrade the data in dirty list by 1 level to level L4 (as shown in arrow 2) so that the dirty data remains at higher level than the clean data. In some embodiments, the data in clean list may be downgraded by c×k levels, where k is a positive integer and c is a positive integer greater than 1, and the data in dirty list may be downgraded by k levels so that the dirty data remains at higher level than the clean data. That is, the data in the dirty list is more likely to be stored in the second cache, and the data in the clean list is more likely to be removed from the second cache if the second cache is full. And then in step S560, data C1 at the front of the oldest clean list is selected as the victim data and is being removed (as shown in cross 3). And since C1 is a read operation, then in step S592, data C1 is inserted to the youngest list L1 of the clean list (as shown in arrow 4). Note that if there is no corresponding entry of data C3 in the TLB, the cache controlling method as shown in FIG. 5 may also be invoked for the TLB entry replacement as described below.

On the other hand, if there is a read operation issued to a cache-resident data D3, that has no corresponding entry in the TLB, then a TLB miss occurs. Suppose the TLB entry of data D1 with both the dirty bit and the access bit as 1 is identified by the TLB hardware as the victim data for the entry replacement. Since data D1 is in a dirty list, and both the dirty bit and the access bit of D1 is 1, performing step S430 to move data D1 is to the youngest dirty list L1 (as shown in arrow 5). And then performing step S490 to move data D3 to the youngest dirty list L1 (as shown in arrow 6).

According to the above embodiments, several cache controlling methods for a memory system are provided to reduce the execution time and improve the performance. Based on the above, a light-weighted software controlled cache for the main memory is provided and a data structure is for managing the access status of page data based on the operations of TLB so as to keep the selected pages in the DRAM cache. The cache controlling method is to give dirty and/or recently accessed pages better chances to stay at the software-controlled DRAM cache to reduce writes to the main memory. On the other hand, the cache controlling method is to updates the management data structure of the DRAM cache only when a TLB miss or a cache miss occurs so as to avoid updating the management data structure frequently.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cache controlling method for a memory system comprising a first cache and a second cache, the method comprising:

updating a first status of a plurality of page data in the first cache by a hardware control circuit of the first cache;

updating respective levels of the plurality of page data in a table in the second cache according to the first status of the plurality of page data by a processor of the second cache, in the table, the plurality of page data arranged from a highest level to a lowest level, wherein in the table, the page data among the plurality of page data having a higher level is accessed more frequently than another page data among the plurality of page data having a lower level;

updating a second status of the plurality of page data in the first cache by the hardware control circuit of the first cache;

updating the respective levels of the plurality of page data in the table in the second cache according to the second status of the plurality of page data by the processor of the second cache;

replacing a victim data in the first cache by an accessing data when the first cache is full;

moving the victim data to the highest level of the table when the first status of the victim data represents that the victim data is being accessed; and moving the accessing data to the highest level of the table when the first status of the victim data represents that the victim data is not being accessed.

2. The cache controlling method according to claim 1, wherein the table comprises a clean list and a dirty list, the clean list including a first group of the plurality of page data, the dirty list including a second group of the plurality of page data, in the clean list, the first group of the plurality of page data is arranged from the highest level to the lowest level, in the dirty list, the second group of the plurality of page data is arranged from the highest level to the lowest level, and the method further comprises:

moving the victim data to the highest level of the dirty list when the second status of the victim data represents that the victim data is being written;

moving the victim data to the highest level of the clean list when the second status of the victim data represents that the victim data is not being written;

moving the accessing data to the highest level of the dirty list when the second status of the victim data represents that the victim data is being written; and moving the accessing data to the highest level of the clean list when the second status of the victim data represents that the victim data is not being written.

3. The cache controlling method according to claim 1, wherein the table comprises a clean list and a dirty list, the clean list including a first group of the plurality of page data, the dirty list including a second group of the plurality of page data, in the clean list, the first group of the plurality of page data is arranged from the highest level to the lowest level, in the dirty list, the second group of the plurality of page data is arranged from the highest level to the lowest level, and the method further comprises:

moving the accessing data to the highest level of the dirty list when the accessing data is used for a writing operation.

4. The cache controlling method according to claim 1, wherein
- the table comprises a clean list and a dirty list, the clean list including a first group of the plurality of page data, the dirty list including a second group of the plurality of page data,
- in the clean list, the first group of the plurality of page data is arranged from the highest level to the lowest level,
- in the dirty list, the second group of the plurality of page data is arranged from the highest level to the lowest level, and
- the method further comprises:
- determining whether the victim data of the second cache is in the clean list; and
- moving the victim data to the highest level of the dirty list when the second status of the victim data represents that the victim data is being written and the victim data of the second cache is not in the clean list.

5. The cache controlling method according to claim 1, wherein
- the table comprises a clean list, a dirty list and a free list, the clean list including a first group of the plurality of page data, the dirty list including a second group of the plurality of page data, and the free list including a third group of the plurality of page data,
- in the clean list, the first group of the plurality of page data is arranged from the highest level to the lowest level,
- in the dirty list, the second group of the plurality of page data is arranged from the highest level to the lowest level,
- in the free list, the third group of the plurality of page data is arranged from the highest level to the lowest level, and
- the method further comprises:
- determining whether the free list is not empty when the accessing data is not in the second cache; and
- removing the victim data out of the free list when the free list is not empty.

6. The cache controlling method according to claim 5, further comprising:
- determining whether the lowest level of the clean list is not empty when the free list is empty;
- removing the page data having the lowest level from the clean list when the clean list is not empty; and
- removing the page data having the lowest level from the dirty list when the clean list is empty.

7. The cache controlling method according to claim 6, further comprising:
- determining whether the lowest level of the dirty list is empty when the free list is empty;
- when the lowest level of the clean list is empty and the lowest level of the dirty list is empty:
- downgrading the levels of all the page data of the clean list; and
- downgrading the levels of all the page data of the dirty list.

8. The cache controlling method according to claim 7, further comprising:
- inserting the accessing data to the highest level of the clean list when the accessing data is used for a read operation; and
- inserting the accessing data to the highest level of the dirty list when the data being accessed is used for a write operation.

9. A cache system, comprising:
- a first cache including a hardware control circuit, configured for storing a first status of a plurality of page data in the first cache by the hardware control circuit; and
- a second cache including a processor, configured for storing a table in the second cache by the process according to the first status of the plurality of page data, in the table, the plurality of page data arranged from a highest level to a lowest level, wherein in the table, the page data among the plurality of page data having a higher level is accessed more frequently than another page data among the plurality of page data having a lower level
- wherein the cache system is configured to:
- update the first status of the plurality of page data in the first cache;
- update respective levels of the plurality of page data in the table in the second cache according to the first status of the plurality of page data,
- update a second status of the plurality of page data in the first cache by the hardware control circuit of the first cache;
- update the respective levels of the plurality of page data in the table in the second cache according to the second status of the plurality of page data;
- identify a victim data in the first cache to be replaced by an accessing data when the first cache is full;
- move the victim data to the highest level of the table when the first status of the victim data represents that the victim data is being accessed; and
- move the accessing data to the highest level of the table when the first status of the victim data represents that the victim data is not being accessed.

10. The cache system according to claim 9, wherein
- the table comprises a clean list and a dirty list, the clean list including a first group of the plurality of page data, the dirty list including a second group of the plurality of page data,
- in the clean list, the first group of the plurality of page data is arranged from the highest level to the lowest level,
- in the dirty list, the second group of the plurality of page data is arranged from the highest level to the lowest level, and
- the cache system is further configured to:
- move the victim data to the highest level of the dirty list when the second status of the victim data represents that the victim data is being written;
- move the victim data to the highest level of the clean list when the second status of the victim data represents that the victim data is not being written;
- move the accessing data to the highest level of the dirty list when the second status of the victim data represents that the victim data is being written; and
- move the accessing data to the highest level of the clean list when the second status of the victim data represents that the victim data is not being written.

11. The cache system according to claim 9, wherein
- the table comprises a clean list and a dirty list, the clean list including a first group of the plurality of page data, the dirty list including a second group of the plurality of page data,
- in the clean list, the first group of the plurality of page data is arranged from the highest level to the lowest level,
- in the dirty list, the second group of the plurality of page data is arranged from the highest level to the lowest level, and the cache system is further configured to:
move the accessing data to the highest level of the dirty list when the accessing data is used for a writing operation.

12. The cache system according to claim 9, wherein the table comprises a clean list and a dirty list, the clean list including a first group of the plurality of page data, the dirty list including a second group of the plurality of page data,
in the clean list, the first group of the plurality of page data is arranged from the highest level to the lowest level,
in the dirty list, the second group of the plurality of page data is arranged from the highest level to the lowest level, and
the cache system is further configured to:
update a second status of the plurality of data in the first cache;
determine whether the victim data of the second cache is in the clean list; and
move the victim data to the highest level of the dirty list when the second status of the victim data represents that the victim data is being written and the victim data of the second cache is not in the clean list.

13. A cache system, comprising:
a first cache including a hardware control circuit, configured for storing a first status of a plurality of page data in the first cache by the hardware control circuit; and
a second cache including a processor, configured for storing a table in the second cache by the process according to the first status of the plurality of page data,
wherein in the table, the plurality of page data arranged from a highest level to a lowest level, the page data among the plurality of page data having a higher level is accessed more frequently than another page data among the plurality of page data having a lower level,
the table comprises a clean list, a dirty list and a free list, the clean list including a first group of the plurality of page data, the dirty list including a second group of the plurality of page data, and the free list including a third group of the plurality of page data,
in the clean list, the first group of the plurality of page data is arranged from the highest level to the lowest level,
in the dirty list, the second group of the plurality of page data is arranged from the highest level to the lowest level,
in the free list, the third group of the plurality of page data is arranged from the highest level to the lowest level,
the cache system is configured to:
update the first status of the plurality of page data in the first cache;
update respective levels of the plurality of page data in the table in the second cache according to the first status of the plurality of page data,
determine whether the free list is not empty when an accessing data is not in the second cache; and
remove a victim data out of the free list when the free list is not empty.

14. The cache system according to claim 13, wherein the cache system is further configured to:
determine whether the lowest level of the clean list is not empty when the free list is empty;
remove the page data having the lowest level from the clean list when the clean list is not empty; and
remove the page data having the lowest level from the dirty list when the clean list is empty.

15. The cache system according to claim 14, wherein the cache system is further configured to:
determine whether the lowest level of the dirty list is empty when the free list is empty;
when the lowest level of the clean list is empty and the lowest level of the dirty list is empty:
downgrade the levels of all the page data of the clean list; and
downgrade the levels of all the page data of the dirty list.

16. The cache system according to claim 15, wherein the cache system is further configured to:
insert the accessing data to the highest level of the clean list when the accessing data is used for a read operation; and
insert the accessing data to the highest level of the dirty list when the accessing data is used for a write operation.

17. The cache system according to claim 15, wherein when the lowest level of the clean list is empty and the lowest level of the dirty list is empty:
all the page data of the clean list is downgraded by c×k levels, where k is a positive integer and c is a positive integer greater than 1, and all the page data of the dirty list is downgraded by k levels.

* * * * *